United States Patent [19]

Moss et al.

[11] Patent Number: 5,613,095
[45] Date of Patent: Mar. 18, 1997

[54] PERIPHERAL CARD HAVING INDEPENDENT FUNCTIONALLY AND METHOD USED THEREWITH

[75] Inventors: Barry Moss, Matsqui; David W. Russo, Burnaby; Thomas W. Lockhart; Ricardo Lim, both of Richmond; Denis Beaudoin, Surrey, all of Canada

[73] Assignee: Motorola, Inc., Schaumburg, Ill.

[21] Appl. No.: 332,008

[22] Filed: Oct. 31, 1994

[51] Int. Cl.⁶ .................... G06F 13/00; G06F 15/177
[52] U.S. Cl. .................. 395/500; 364/232.2; 364/238.5; 364/247.3; 364/284; 364/DIG. 1
[58] Field of Search ....................... 395/325, 500; 340/825.86; 364/488, 489, 490, 712

[56] References Cited

U.S. PATENT DOCUMENTS 5,334,030  8/1994  Brilliott ........................... 439/75
5,334,046  8/1994  Brouillette et al. ............... 439/540
5,365,221  11/1994  Fennell et al. .................... 340/636
5,404,494  4/1995  Garney ............................. 395/500
5,440,244  8/1995  Richter et al. .................... 326/37
5,451,933  9/1995  Stricklin et al. ............... 340/825.06
5,455,505  10/1995  Laplace et al. .................... 323/343

*Primary Examiner*—Kevin J. Teska
*Assistant Examiner*—Ayni Mohamed
*Attorney, Agent, or Firm*—Kevin Buford

[57] ABSTRACT

A PCMCIA card having independent functionality and alternatively arranged to operate in conjunction with a host computer, that includes a peripheral apparatus (109) having an integral CPU (125), a power source (129), and a power supply (127) for exhibiting an independent operating state; and an interface function (121) integral with and coupled to said peripheral apparatus (109), said interface function arranged and constructed to couple said peripheral apparatus to the host computer (101) over a PCMCIA compliant interface and initiate a dependent operating state at said peripheral apparatus (109).

10 Claims, 3 Drawing Sheets

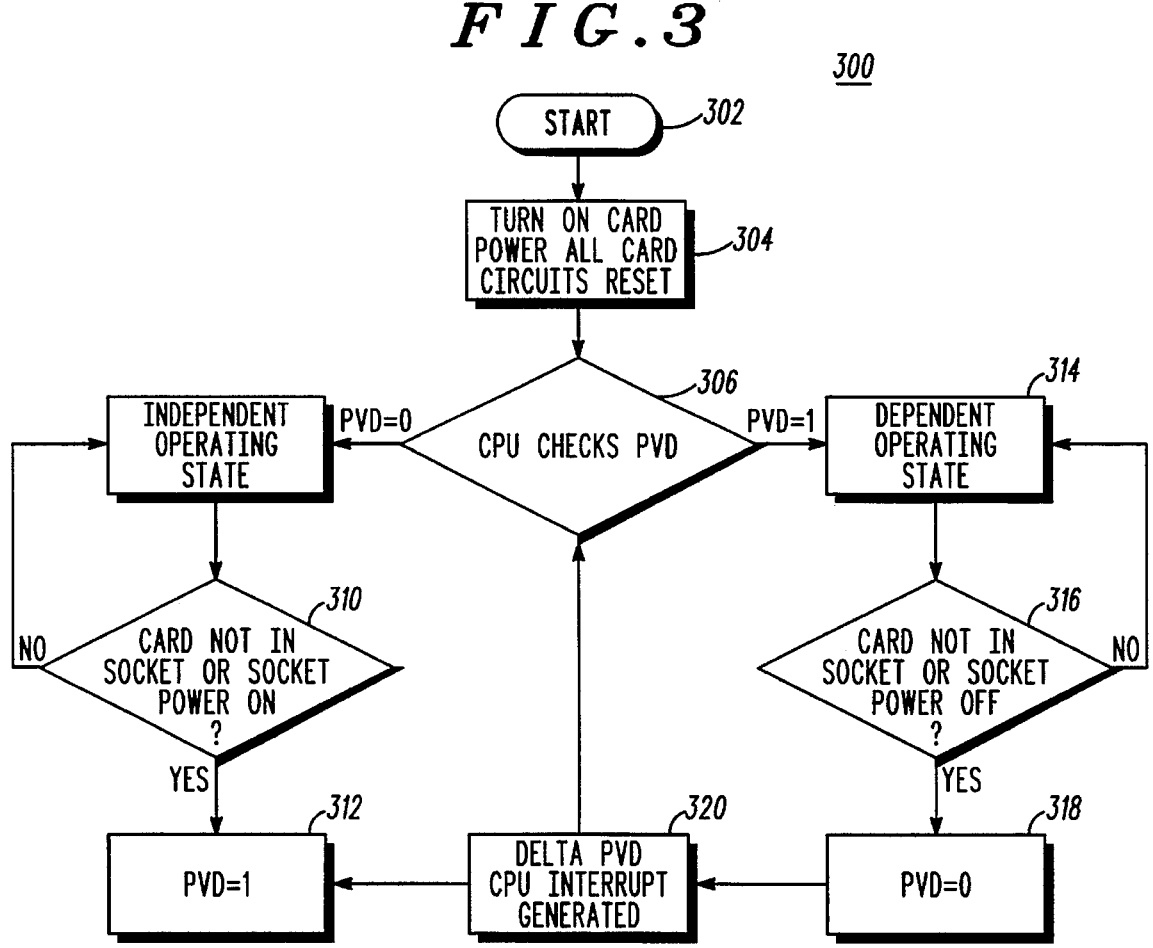

PERIPHERAL CARD HAVING INDEPENDENT FUNCTIONALLY AND METHOD USED THEREWITH

FIELD OF THE INVENTION

This disclosure deals with peripheral functionality arranged and constructed to interface to a host computer and more specifically but not limited to independent functionality in the form of peripheral cards having a Personal Computer Memory Card International Association (PCMCIA) compliant interface arranged to operate in conjunction with the host computer.

BACKGROUND OF THE INVENTION

General and special purpose host computers often include provisions for various peripheral functionality, such as a communications modem, memory expansion, or an add on hard disk drive. In order to facilitate the addition of various peripherals the Personal Computer Memory Card International Association (PCMCIA) has endeavored to standardize a family of peripheral cards with a requisite PCMCIA interface. The PCMCIA defined parameters can be found in the PC Card Standard Release 2.0 document, published by the PCMCIA, 1030B East Duane Avenue, Sunnyvale Calif. and incorporated herein by reference. The defined parameters include physical parameters such as dimensions, input/output connections such as control, address, and data buses, signal parameters such as operating levels, and impedances, power levels, source polarity and levels and certain operating procedures.

Based upon the provisions supported by the host computer for additional devices such as the PCMCIA devices it is generally known that PCMCIA peripheral cards draw their power from the host computer socket and are generally controlled by a single RESET line when inserted or removed from the host computer socket in order to reinstate functionality.

However, a new class of PCMCIA devices, such as wireless modems, and the like, available from manufacturers such as Motorola, Inc. at 1303 East Algonquin Road, Schaumburg, Ill. 60193, are designed to continue to operate while removed from the socket or while the socket and the host computer are powered-off. These PCMCIA devices have their own power source and CPU that allows each device to maintain independent functionality once removed from the host computer socket. This paradigm shift allow the users the enhanced capabilities of remaining logged into a network while removed from the host computer thus operating in a manner that allows them to maintain a partial communication link such as, for example storing messages until the peripheral card is reinserted into the host computer.

However since existing PCMCIA peripheral cards, are designed to function in accordance with the PCMCIA standard where the only power source and reset state is generated by the host computer, an undesirable phenomenon can occur. This phenomenon results in the circuitry on the peripheral cards being unnecessarily or inadvertently reset, thus interfering with the planned or expected functionality of the device.

Clearly a need exists for a peripheral function or card that has a PCMCIA compliant interface that is additionally capable of operating reliably in a deterministic fashion in an environment where the host device and peripheral device both contain their own CPU and power source.

BRIEF DESCRIPTION OF THE DRAWINGS

The features of the present invention which are believed to be novel are set forth with particularity in the appended claims. However, the invention together with further advantages thereof, may best be understood by reference to the accompanying drawings wherein:

FIG. 3 flowchart diagram of the steps performed at the peripheral card for determining whether the peripheral card is in a dependent or independent operating state.

DETAILED DESCRIPTION OF A PREFERRED EMBODIMENT

Generally this disclosure deals with a peripheral arrangement for a host computer. The peripheral arrangement includes a peripheral card that has a PCMCIA compliant interface that may be generally and advantageously employed when, among others, the peripheral arrangement includes independent functionality, such as may be present if a separate power supply and controller (CPU) is included with the peripheral arrangement. The preferred embodiment is a peripheral card that exhibits an independent and dependent operating state and has an interface function that is coupled to the peripheral card. The interface function is arranged and constructed to couple the peripheral card to the host computer over the PCMCIA compliant interface and initiate a dependent operating state at the peripheral card when inserted in a host computer that is or is subsequently powered up. The interface function that is coupled to the peripheral card during the dependent operating state, initiates an independent operating state when the peripheral card is removed or the host computer is powered down.

Figure 1:
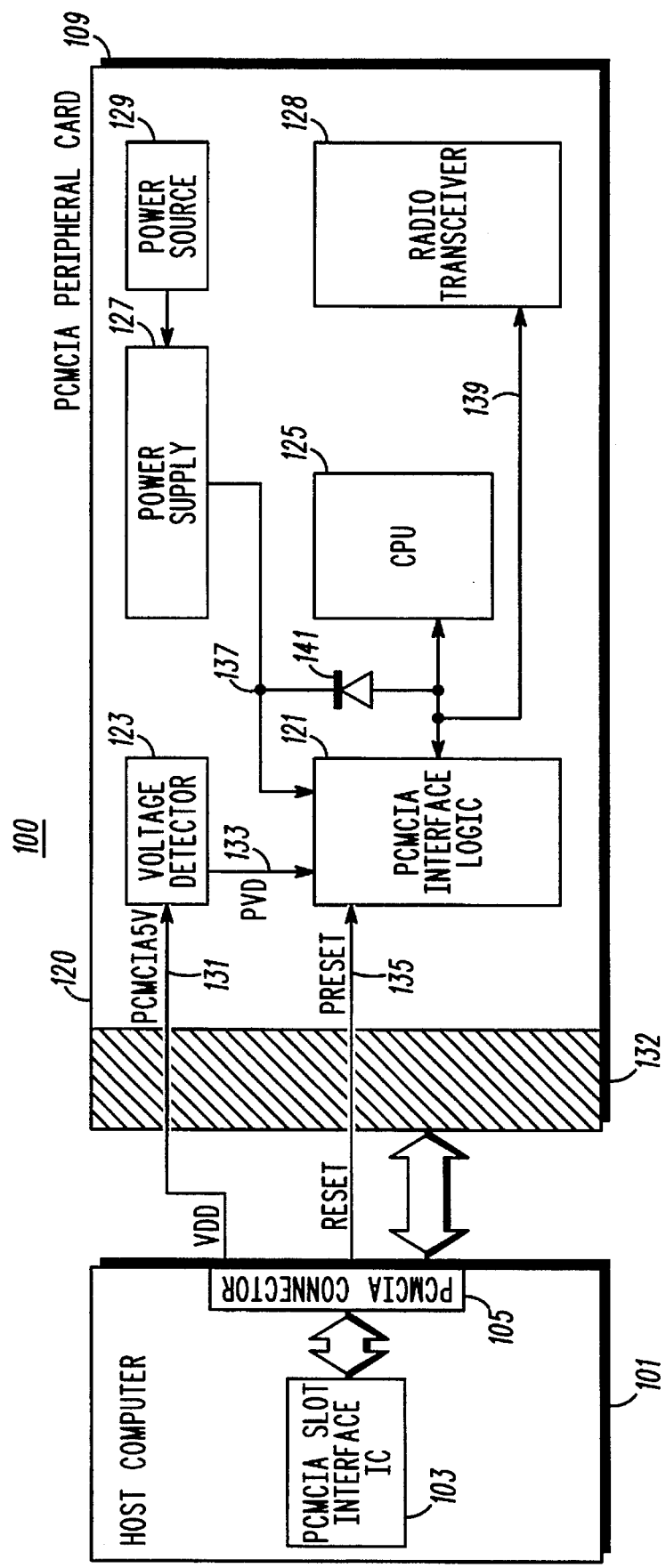
FIG. 1 is a block diagram of a host computer and peripheral card suitable for employing a preferred embodiment in accordance with the instant invention.

A preferred embodiment in accordance with the instant invention will be further explained with reference to the Figures, in which FIG. 1 is a block diagram of a host computer (101) and a peripheral arrangement (120) suitable for employing a preferred embodiment in accordance with the instant invention. Depicted in FIG. 1 is the host computer (101) having a PCMCIA slot interface integrated circuit (103) or the like and a PCMCIA connector (105). The peripheral arrangement (120) includes a peripheral card (109) having a PCMCIA interface logic (121), a voltage detector (123), a CPU (125), a power supply (127), a radio transceiver (128), a battery (129), and a PCMCIA connector (132).

The peripheral arrangement (120) is coupled, interfaced, or connected to the host computer (101) by plugging the PCMCIA connector (132) of the peripheral card (109) into the PCMCIA connector (105) of the host computer (101). All these elements (121), (123), (125), (127), (128), (129), and (132) of the peripheral arrangement (120) may be physically located on one PCMCIA compliant or consistent card or the PCMCIA connector (132) may be physically separated from the peripheral card (109) with the physical connection provided by some mechanism, such as a cable, connecting the two. The host computer (101) can be any general purpose computer that includes functionally and logically as well as, preferably, physically a PCMCIA interface that operates according to the PCMCIA standards. The preferred embodiment of the instant invention is considered to be consistent or compliant with the PCMCIA standards and defined PCMCIA interfaces and ports, provided it operates at least in part in accordance with the PCMCIA interface and transparently to the host computer's hardware, operating system software, or other attributes.

In any event the preferred embodiment of the first peripheral card (109), includes, all inter coupled as depicted, a controller, preferably, a central processing unit CPU (125) with associated RAM and ROM, such as a Motorola MCM68300 series microprocessor, a radio transceiver (128) that is arranged to transceive data over a communications medium all as well known in the art, a power supply (127) and a power source, preferably, battery (129) such as NiCAD or 9 volt alkaline or lead acid, that is coupled to the power supply (127). Circuitry, well known, in the power supply (127) allows the CPU (125) to detect the status of the power supply (127) in order to determine the operating state of the peripheral card (109).

In the preferred embodiment whenever the peripheral card (109) is disconnected, decoupled, or pulled out of the host computer (101) by disengaging the PCMCIA connector (105) from the PCMCIA connector (132) or when the host computer's PCMCIA slot interface (103) is powered down while the peripheral arrangement (120) is inserted, the PCMCIA will initiate an independent operating state as described below.

When the PCMCIA power supply line, PCMCIA5V (131) drops below a preset voltage, the voltage detector (123) will deassert the PVD signal (133), which will in turn cause a CPU interrupt signal, GPINT (221) to be generated. The CPU, upon receiving the interrupt, determines the current state of the PVD signal, which can be read as a bit in the PCMCIA interface logic (121). The CPU, having determined that PVD is unasserted, then initiates an independent operating state. At the same time, the deassertion of the PVD signal (133) causes the first register set (201) to be cleared to a default state and held in that default state until the card is reinserted into a powered PCMCIA slot. This ensures that the PCMCIA interface will operate in memory only mode (as opposed to I/O mode) when the card is reinserted into a PCMCIA slot regardless of the interface mode established when the card was removed from the slot.

Consequently, when the card is reinserted or the host computer's PCMCIA slot is powered up, the PCMCIA card will initiate a dependent operating state based on the assertion of the PVD signal. When the PCMCIA power supply line, PCMCIA5V (131) rises above a preset voltage, the voltage detector (123) will assert the PVD signal (133), which will in turn cause a CPU interrupt signal, GPINT (221) to be generated. The CPU, upon receiving the interrupt, determines the current state of the PVD signal, which can be read as a bit in the PCMCIA interface logic (121). The CPU, having determined that PVD is asserted, then initiates a dependent operating state.

In order to avoid the phenomenon of unnecessarily resting circuitry, the PCMCIA card uses four reset signals, each of which resets a specific domain of circuitry. The P_RESET (135) signal originating from the PCMCIA host computer (101) and the PVD signal (when unasserted) primarily reset those circuits which are directly controlled by the PCMCIA host. The C_RESET circuit primarily resets those circuits which are controlled by the integral CPU (125). The fourth reset signal, power on reset, POR (137), originates from the on-board power supply and acts as a global reset of all circuits on the PCMCIA card. POR is asserted (active low) whenever the output of the on-board power supply is below the minimum operating voltage for the PCMCIA card.

Figure 2:
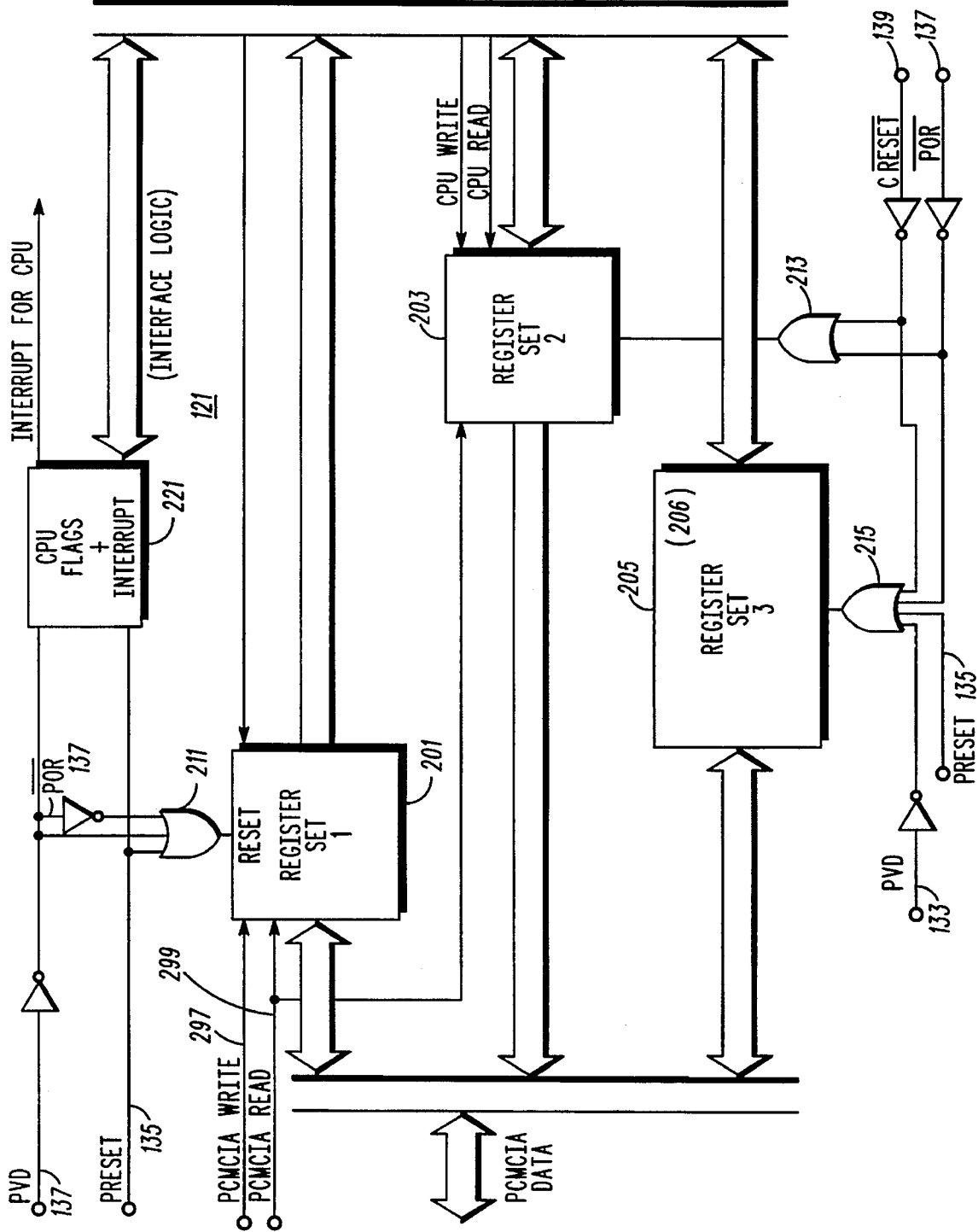
FIG. 2 is a detailed block diagram of the peripheral card of FIG. 1.

FIG. 2 is a detailed block diagram of the peripheral card of FIG. 1. The interface function or PCMCIA interface logic (121) contains three major functional blocks, a first set of registers or PCMCIA registers (201), a second set of registers or CPU registers (203), and a communications block (205) having a third set of registers (206).

The first set of register (201) contains a plurality of registers which can be read and written through the PCMCIA interface via the PCMCIA read and write signals 299, 297 but which may only be read through the CPU interface via CPU read 295. The first set of registers is reset by any one of three reset conditions each coupled through OR gate 211, the PRESET signal (135) being asserted, the POR, active low, signal (137) being asserted or the PVD signal (133) being unasserted. The second set of registers (203) contains a plurality of registers which can be read and written through the CPU interface via CPU read and write 295, 293 but which may only be read through the PCMCIA interface via PCMCIA read 299. The second set of registers is reset by either the CRESET, active low, signal (139) or the POR, active low, being asserted. The communication block (205) contains a third set of registers (206) and their associated logic such as FIFO memory registers and control logic registers. The FIFO memory registers are used to buffer data from the PCMCIA interface to the CPU interface and to buffer data from the CPU interface to the PCMCIA interface. The communications block (205) is reset by any one of the four reset conditions each as coupled through OR gate 215, the PRESET signal (135) being asserted, the POR, active low, signal (137) being asserted, CRESET, active low, signal (139) being asserted, or the PVD signal (133) being unasserted.

As previously stated, in order to avoid the phenomenon of unnecessarily resetting circuitry, the PCMCIA card uses the four reset signals as described, each of which resets a specific domain of circuitry.

The host computer will assert the P_RESET signal (135) whenever it wishes to place the card into a default condition, usually whenever a new card is inserted into the slot, or when the host computer itself is reset. The assertion of the P_RESET signal (135) resets the first set of registers or PCMCIA registers (201), and the third set of registers (205) associated with the interface function or PCMCIA interface logic (121). This causes those registers associated with the card interface mode to be reset to memory only access as well as resetting any other registers which had been previously altered by the PCMCIA host, and clears the communications block in preparation for a new communications session.

The PCMCIA interface logic (121) further includes a second set of registers or CPU registers (203) coupled to the integral CPU (125). The integral CPU (125) asserts the CRESET*(where '*' signifies active low) signal whenever it wishes to place the card into a default condition, usually as the result of a software reset, a watchdog timer expiration, or to recover from an error condition. The CRESET* assertion resets the second set of registers and the third set of registers (205) coupled to the CPU (125). This causes all registers which could have been altered by the CPU to be reset, and clears the communications block in preparation for a new communications session.

The assertion of the POR* signal (137) resets the first set of registers, the second set of registers, and the communications block in order to completely reset the PCMCIA interface logic (121) after the power supply output is stable above the minimum operating voltage. Referring to FIG. 1, the POR* signal (137) is coupled to the CRESET* signal (139) via a diode (141) in order to allow the POR* signal to also reset the CPU (125) and the radio transceiver (128).

The PVD signal (133) de-assertion resets the first set of registers (201) and the third set of registers (205). This causes those registers associated with the card interface mode to be reset to memory only access as well as resetting any other registers which had been previously altered by the PCMCIA host, and clears the communications block in preparation for a new communications session when the PCMCIA card is reinserted into a powered PCMCIA slot.

FIG. 3 is flowchart diagram of the steps performed at the peripheral card for determining whether the peripheral card is in a dependent or independent operating state. Beginning with START block 302, flow proceeds to block 304 where the power to the card is turned on by the power switch on the card. This action causes the on-board power supply to generate a power-on reset which resets all circuit on the card. During the card initialization, at block 306, the integral CPU checks if there is power on the PCMCIA interface by examining the PCMCIA Voltage Detect (PVD) signal. If PVD is asserted; i.e. PVD=1, the CPU places the card in a dependent operating state at block 308; otherwise the CPU places the card in an independent operating state at block 314.

While the card is in an dependent operating state, the interface circuit monitors the PCMCIA power line. If the card is removed from the socket or power is removed from the socket, then PVD=0 at block 316 and a delta PVD interrupt is generated to the integral CPU at block 318.

Similarly, while the card is in an independent operating state, the interface circuit monitors the PCMCIA power line. At block 310, if the card is placed in socket and power is applied to the socket, then PVD=1 at block 312 and a delta PVD interrupt is generated to the integral CPU at 320.

Whenever the CPU receives a delta PVD interrupt, the integral CPU checks if there is power on the PCMCIA interface by examining the PCMCIA Voltage Detect (PVD) signal. If PVD is asserted; i.e. PVD=1, the CPU places the card in a dependent operating state; otherwise the CPU places the card in an independent operating state.

Those skilled in the art will recognize that the instant invention provides a peripheral card with independent functionality that is capable of operating in a independent state when de coupled from a host computer and in a dependent state when coupled to the host computer. Furthermore, the peripheral card may alternatively or additionally be arranged to operate in conjunction with the host computer over a PCMCIA compliant interface.

It will also be apparent to the skilled that the disclosed invention may be modified in numerous ways and may assume many embodiments other than the preferred form specifically set out and described above.

An alternate embodiment of the present invention would not require a voltage detection scheme, as used in a preferred embodiment and described above, but instead would use watchdog timers. If after a predetermined time period, the host computer has not interacted with the PCMCIA card, it would be assumed by the PCMCIA card that it was out of the socket. The CPU on the PCMCIA card would place the card into a independent operating mode. Subsequently, if communications with the host processor is restored, the CPU on the PCMCIA card would resume a dependent operating mode.

Accordingly, it is intended by the appended claims to cover all modifications of the invention which fall within the true spirit and scope of the invention.

What is claimed is:

1. A PCMCIA card having independent functionality and alternatively arranged to operate in conjunction with a host processor, comprising:

a peripheral apparatus comprising a peripheral processor, a power unit, and a voltage detector operating to assert a PCMCIA voltage detect (PVD) signal, said peripheral apparatus being adapted for both a dependent operating state and an independent operating state, said peripheral processor initiating said dependent operating state at said peripheral apparatus, responsive to said PVD signal;

an interface function coupled to said peripheral apparatus, said interface function comprising plural state dependent registers selectively reset based on a change in operating state of the peripheral apparatus, the interface function being arranged and constructed to couple said peripheral apparatus to the host processor over a PCMCIA compliant interface, wherein said plural state dependent registers comprise a first set of registers associated with said PCMCIA card coupled to said host processor over said PCMCIA compliant interface, said host processor operating to assert a PCMCIA reset (PRESET) signal to reset said first set of registers and a second set of registers coupled to said peripheral processor, said peripheral processor operating to assert a CPU reset (CRESET) signal to reset said second set of registers.

2. The PCMCIA card of claim 1, wherein said plural state dependent registers further comprise a communications block having a third set of registers coupled to said host processor, said host processor operating to assert the PCMCIA reset (PRESET) signal to reset the communications block.

3. The PCMCIA card of claim 2, wherein said interface function further includes said communications block coupled to said peripheral processor, said peripheral processor operating to assert the CPU reset (CRESET) signal to reset the communications block.

4. The PCMCIA card of claim 1, wherein the peripheral apparatus further includes a radio transceiver.

5. The PCMCIA card of claim 1, further comprising a first status bit being set by an assertion of said PVD signal and being readable by said CPU.

6. The PCMCIA card of claim 5, wherein an interrupt to said CPU is generated whenever said first status bit is changed.

7. The PCMCIA card of claim 1, further comprising a second status bit being set by an assertion of said PRESET signal and being readable by said CPU.

8. The PCMCIA card of claim 7, wherein an interrupt to the CPU is generated whenever said second status bit is set.

9. The PCMCIA card of claim 1, wherein said power supply asserts a power-on reset (POR) signal, responsive to a predetermined voltage level, said power-on reset signal resets all circuitry on said PCMCIA card.

10. A peripheral card arranged to operate in conjunction with a host processor and alternatively having independent functionality comprising in combination:

a peripheral apparatus comprising a peripheral processor, a power unit, and a voltage detector operating to de-assert a PCMCIA voltage detect (PVD) signal, the peripheral apparatus being adapted for a dependent operating state when operating in conjunction with the host processor and an independent operating state when uncoupled from the host processor; and an interface coupled to said peripheral apparatus, said interface comprising plural state dependent registers selectively reset based on a change in operating state of the peripheral apparatus, wherein the plural state dependent registers comprise a first set of register associated with an interface mode and a second set of registers alterable by the host processor, the interface being arranged and constructed to couple said peripheral apparatus to the host processor; and wherein said peripheral processor initiated said independent operating state at said peripheral apparatus, responsive to said PVD signal, and the de-assertion of said PVD signal further resets the first and second set of registers.

* * * * *

UNITED STATES PATENT AND TRADEMARK OFFICE
CERTIFICATE OF CORRECTION

PATENT NO. : 5,613,095

DATED : March 18, 1997

INVENTOR(S) : Barry Moss; David W. Russo; Thomas W. Lockhart; Ricardo Lim; Denis Beaudoin It is certified that error appears in the above-identified patent and that said Letters Patent is hereby corrected as shown below:

Title page, item [54], and col. 1, line 1,

Title reads "Peripheral Card Having Independent Functionally and Method Used Therewith"--Title should read "Peripheral Card Having Independent Functionality and Method Used Therewith".

Column 8, Line 1 reads "initiated"--should be "initiates"

Signed and Sealed this

First Day of July, 1997

*Attest:*

*Attesting Officer*

BRUCE LEHMAN

*Commissioner of Patents and Trademarks*